UNITED STATES PATENT OFFICE.

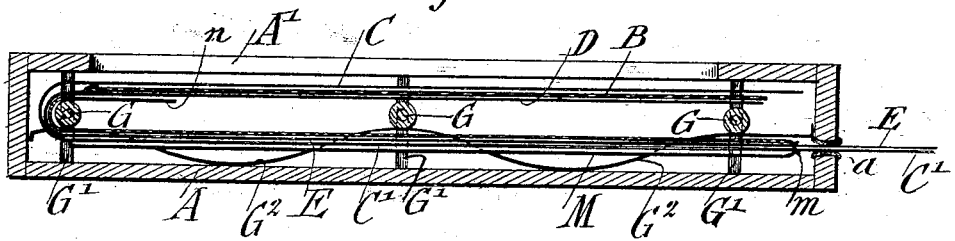
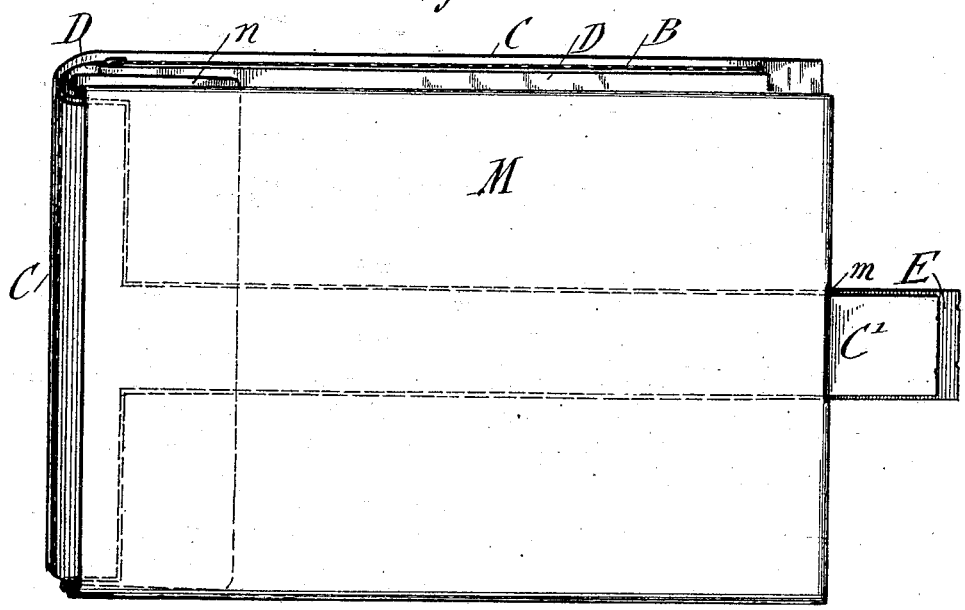

ALEXANDER J. FINKLE, OF WILLIAMSBURG, NEW YORK.

FLAT-FORM PHOTOGRAPHIC-FILM PACKAGE.

No. 910,052.   Specification of Letters Patent.   Patented Jan. 19, 1909.

Application filed August 30, 1907. Serial No. 390,701.

*To all whom it may concern:*

Be it known that I, ALEXANDER J. FINKLE, a citizen of the United States, and a resident of Williamsburg, county of Kings, State of New York, have invented certain new and useful Improvements in Flat-Form Photographic-Film Packages, of which the following is a specification.

This invention relates to flat-form photographic film packages such as shown in U. S. Letters Patent No. 728,718, C. E. Hutchings and J. A. Robertson dated May 19, 1903. In the packages therein shown and others similar thereto, it is necessary to expose all the films in the package before developing the same, or if it be desired to develop one particular film, it is necessary to open one end of the package in the darkroom, take out the film, and again securely close the package to prevent the entrance of light.

The object of this invention is to overcome the disadvantages of the packages hitherto in use, and to provide means to enable any film to be removed from the package after having been exposed, and fully protect such film from light until it is desired to develop the same.

The invention has further for its object the provision of a protecting cover for each film, the object of which is to protect the sensitive surface of the film before it is exposed.

For this purpose, my invention consists of the combination of a film having a manipulating tab, and an envelop, through which the tab passes and into which the film is drawn by the continued pulling of the tab.

The invention consists further of a film having a movable protecting cover, adapted to be withdrawn from the film before the exposure of the same.

The invention will be more fully described hereinafter and finally pointed out in the claims.

In the accompanying drawing, Figure 1 shows a sectional view of a film package, showing the relative position of a film cover and its envelop, and Fig. 2 is a perspective view of the package showing the film before its entrance into its envelop.

Similar letters of reference indicate corresponding parts.

Referring to the drawing, the package A is provided with an exposure opening $A^1$, at its upper side, and has at one end an opening $a$. A plurality of films B, each having a backing D, and a manipulating tab E, are arranged in the package proper A, so that the films may be successively exposed as one after the other is drawn away. For the sake of clearness only one film is illustrated in the drawing. The particular manner of holding the films in position is by the rods G, having their ends engaging slots $G^1$, in the inner sides of the package, and acted upon by suitable springs $G^2$. The films being thus held are perfectly plane and so present a plane surface to the light on exposure.

Hitherto, it was customary, after a film had been exposed, to pull on the manipulating flap of the film until a mark thereon became visible, whereupon the flap was torn off, and the film allowed to remain in the package until ready to be developed. In the present invention, however, I provide substantially one envelop M for each film an individual envelop, each of which has an opening or slot $m$ at the closed end. A flap $n$ is provided at the other or open end. The flap is interposed between two superimposed films so as to separate them, and at the same time guides the upper of the two films when drawn away from the exposure-aperture by the pulling of the manipulating tab. The envelops are located below the films, at the lower part of the package and arranged correspondingly to the films. The tab of each film enters the envelop at its open or flap end and passes through the same and out of it through the slot $m$, and finally extends out of the package at the opening $a$.

With the film and envelop with tab passing through it and extending out of the package, all in the position as shown in Fig. 1, where but one unit is shown, the film is ready to be subjected to an exposure. It will be noticed that the end of the backing is so arranged as to just enter the open end of the envelope. When the film has been exposed, the tab is pulled, and thereby the film with its backing drawn into the envelop, the continued pulling causing the film to be drawn completely into the envelop until the end of backing abuts against the end of the envelop where the slot is located. The further pulling of the tab will cause the envelop together with the film inclosed to be drawn completely out of the package, when the flap of the envelop is quickly turned over and sealed. Thus by means of the individual envelop into which the exposed film is drawn, it becomes possible to develop the films as desired, independent of the remaining films.

A further advantage of the improvement consists in being able to use the envelops for the convenient care-taking of the films after they have been developed and prints made therefrom.

For the purpose of protecting each individual film before exposure, each of the same is provided with a cover C of light-proof paper between which and the backing the film is positioned. Said cover is provided with a manipulating tab $C^1$, which is similar to the tab E and is passed into the envelop M alongside the latter. When the film is to be exposed the tab $C^1$ is pulled through the envelop so that the cover is drawn from over the film into the envelop and permits the exposure of the film. So with the remaining films, as each cover is interposed between the exposure opening and the uppermost film, it must be removed by being drawn away from the film to which it belongs before that film can be exposed. The tab E of the backing is not pulled until after the exposure, as before described.

I have described a practical embodiment of my invention, but I do not wish to be limited to the details shown since changes might be made therein without departing from the spirit of my invention.

Having thus described my invention, I claim as new and desire to secure by Letters Patent:

1. In a photographic film-package, the combination with a film having a manipulating tab, of an individual envelop therefor having an open end with a flap and a slot at the opposite end for the passage of the tab.

2. In a photographic film-package, the combination with the package proper, of a film therein having a manipulating tab, and an envelop in the package into which the film is drawn by pulling said tab.

3. In a photographic film-package, a film in combination with an individual envelop therefor so arranged and so combined with the film that the latter may be drawn into it after having been exposed.

4. In a photographic film-package having an exposure opening, a plurality of superimposed films, each having its sensitive side facing in the direction of the exposure opening, in combination with a plurality of individual protection covers, one cover for each film, so arranged and combined that each individual protection cover may be drawn away immediately prior to the exposure of the film which it covered.

5. In a photographic film package having one or more films, the combination of a protection cover for each film with an envelop for each film into which the cover and film may be drawn.

6. In a photographic film package having one or more films each having a tab, the combination of a protection cover having a tab for each film with an envelop for each film into which the cover and the film may be drawn by the tab passing through it.

7. In a photographic film-package, the combination with a film having a manipulating tab, and an envelop having a flap extending below the film and having an opening for the passage of the manipulating tab, all arranged so that on pulling the tab the film will be drawn over the flap and into the envelop.

8. In a photographic film-package, a film, and an envelop located in the film-package and not inclosing the film, and so arranged and combined with the film that the film may be drawn into it after having been exposed.

9. In a photographic film-package having an exposure-opening, a film in the exposure-opening part of the film-package, a separate envelop located below the film, and in that part of the film-package away from the exposure-opening part thereof, so arranged and combined with the film that the film may be drawn into it after having been exposed.

In testimony, that I claim the foregoing as my invention, I have signed my name in presence of two subscribing witnesses.

ALEX. J. FINKLE.

Witnesses:
C. P. GOEPEL,
HENRY J. SUHRBIER.